United States Patent [19]
Schmitt

[11] Patent Number: 5,314,176
[45] Date of Patent: May 24, 1994

[54] METHOD OF PREPARING TRACKABLE RESPONSE DEVICES WITH INSPECTION BEFORE PRINTING ADDRESS THEREON

[75] Inventor: Stephen E. Schmitt, Winnetka, Ill.

[73] Assignee: Berlin Industries, Inc., Carol Stream, Ill.

[21] Appl. No.: 941,663

[22] Filed: Sep. 8, 1992

[51] Int. Cl.⁵ .............. B41F 13/54; G06F 15/20; G06G 7/48
[52] U.S. Cl. .................. 270/1.1; 270/21.1; 364/478; 364/552
[58] Field of Search ............ 270/1.1, 53, 58, 21.1; 364/478; 235/375

[56] References Cited

U.S. PATENT DOCUMENTS

| | | | |
|---|---|---|---|
| 3,697,061 | 10/1973 | Levine et al. | 270/5 |
| 3,993,299 | 11/1976 | O'Brien et al. | 270/5 |
| 4,022,455 | 5/1977 | Newsome | 270/54 |
| 4,121,818 | 10/1978 | Riley . | |
| 4,279,409 | 7/1981 | Pemberton | 270/5 |
| 4,395,031 | 7/1983 | Gruber . | |
| 4,521,862 | 6/1985 | King et al. | 364/552 |
| 4,564,470 | 1/1986 | Schmitt | 270/5 X |
| 4,752,675 | 6/1988 | Zetmeir | 235/375 |
| 4,778,167 | 10/1988 | Snow et al. | 270/58 X |
| 4,791,281 | 12/1988 | Johnsen et al. | 235/383 |
| 4,908,761 | 3/1990 | Tai | 364/401 |

*Primary Examiner*—Edward K. Look
*Assistant Examiner*—John Ryznic

[57] ABSTRACT

Trackable response devices such as redeemable coupons are prepared by forming multiple sets of response devices. Each set might comprise a book having multiple pages of coupons. A tracking code is printed on least some of the response devices of each set. The tracking code for the response devices within a particular set is the same, and the tracking code for each set is different. After the sets are formed, each set is printed with an address, and the address of each set and the tracking code of the set is stored.

3 Claims, 6 Drawing Sheets

METHOD OF PREPARING TRACKABLE RESPONSE DEVICES WITH INSPECTION BEFORE PRINTING ADDRESS THEREON

BACKGROUND

The invention relates to trackable response devices such as redeemable coupons. More particularly, the invention provides a method for inexpensively and efficiently identifying the persons who return response devices Response devices are commonly used by direct marketers and include coupons, order forms, reply cards, etc. which are sent or provided to the public with the hope that the recipient will redeem or send back the response device. For example, "cents-off" coupons can be redeemed for cash when a particular product is purchased by redeeming the coupon at the point-of-purchase. The store or other point-of-purchase then returns the coupon to the manufacturer or marketing service for credit.

In order to save on mailing costs, a number of response devices are typically packaged together in a booklet, flyer, card deck, or the like for mailing. When a response device is returned, the direct marketer should be able to "track" the response to the original recipient. The marketer can thereby obtain useful information, for example, the identity of persons who redeem or return response devices, the type of products which are purchased by a particular person, etc.

Various methods of tracking response devices have been used, but each of these prior methods has certain disadvantages. For example, one tracking method simply asks the recipient to fill in his name and address. However, before that information can be used efficiently by the marketer, the information must be manually inputted to a computer or other data storing device.

Other tracking methods use code numbers or bar codes which are printed on the response device. However, correlating the tracking code with the name and/or address of the recipient has heretofore caused certain problems. In general, there are three current methods for printing tracking codes:

Inkjet Codes on Bindery Line: uncustomized "signatures" (each signature comprises one or more sheets) are imaged with individual heads, e.g., printers, and are collated and stitched on a bindery line or stitcher. This requires multiple heads and separating the book into numerous components. It is inefficient to image many pages on a bindery line.

Wide Bar Imagers or Laser Printers: pre-printed rolls are run through an imager or laser printer. Customized information including the address is applied, and the components are either sheeted, rewound, or folded. They are then collated, inserted, finished, and mailed. However, this equipment is slow and expensive.

In-line Finishing and Addressing: pieces or books are printed, then customized, addressed, folded, trimmed, and packaged for mailing, all on a printing press. A roll of paper goes in one end of the press, and finished product comes out the other end to go into mail bags. However, it is difficult to "catch" the product; when press problems occur, it is difficult to avoid omitting addresses; and press slowdowns can hamper output.

If both an address and a code number are used, they are applied on the same machine so that the address and code number can be correlated and stored on computer tape or disk. However, if the machine breaks down or the paper web breaks, which are not uncommon occurrences, the operator must determine where the machine is in the address list and start from that point so that no addresses are lost. That requires additional time and labor.

Another problem with printing the address on the stitcher or binder or on any other machine before the book is inspected for quality is that if a book is rejected and discarded, the address on that book is also discarded. Each address on a rejected book must be noted and reprinted on a new book.

Another prior art method is called mail matching. Different addressed components are prepared, and each componnet is kept in the same sequence. The components are then collated, making sure that they match. The matching can be done manually or by scanning each component to make sure that they match. The "match" is created by the sequence in which the components are produced and not by recording which components are printed with which address. The main problem with mail matching is the difficulty in keeping the components in the proper sequence and correcting them if they get out of sequence.

SUMMARY OF THE INVENTION

The unique method of the invention applies the identifying information, e.g., the tracking code and the address in two steps. When the response device is printed, the identifying tracking code is printed. Each response device can therefore be identified uniquely by the tracking code. Finished "signatures" from the printing press can contain multiple response devices as well as multiple sets of response devices. In the second step the "encoded" signatures or sets of response devices are brought to a mailing line which can be a saddle stitcher, collator, wrapper, folder, perfect binder, mailing table, etc. On the mailing line, each set of response devices is identified by scanning the code, and each set is addressed, for example, with inkjet equipment. As the sets of response devices are addressed, the address and code are correlated and recorded to create a data record that matches the address to the codes. When a consumer returns a response device, the code is scanned and the address which is associated with that code is retrieved from that data record.

DESCRIPTION OF THE DRAWING

The invention will be explained in conjunction with illustrative embodiments shown in the accompanying drawing, in which.

DESCRIPTION OF SPECIFIC EMBODIMENT

Figure 1:
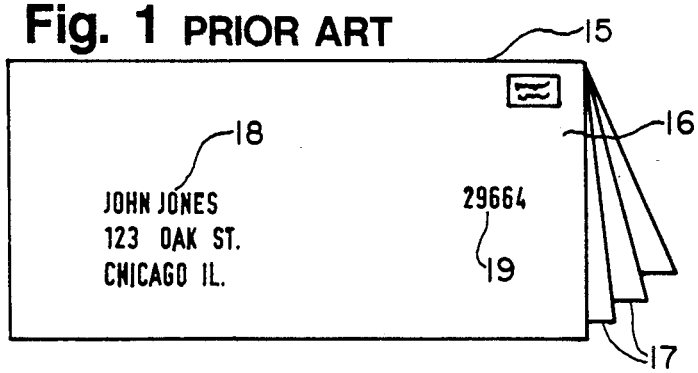
FIG. 1 is a perspective view of a prior art coupon mailer book which is printed with a code number.
Figure 2:
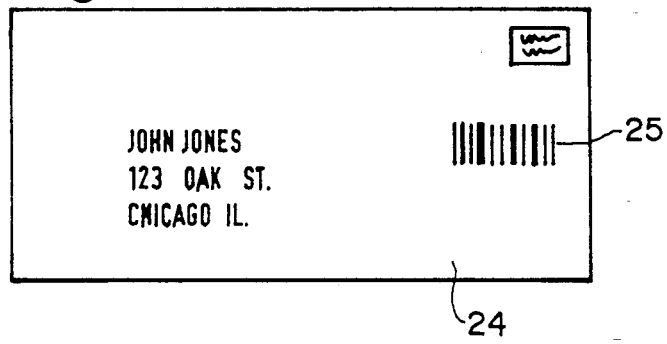
FIG. 2 is a perspective view of a prior art coupon mailing book which is printed with a bar code.

Prior art response devices are illustrated in FIGS. 1 and 2. In FIG. 1 a mailing book 15 includes a cover 16 and multiple inside pages 17 (see FIG. 3). Each inside page of the book includes an advertisement and a clip-out or perforated coupon which can be redeemed for cash at a point-of-purchase.

Figure 3:
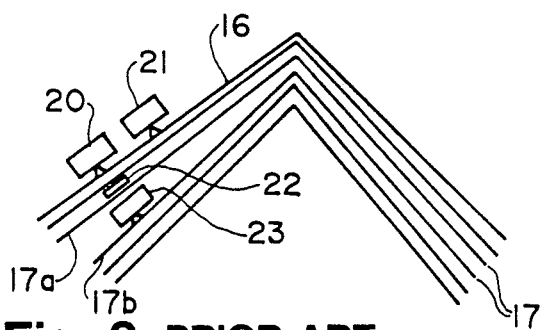
FIG. 3 illustrates the prior art method of printing the address and a tracking code on a plurality of signatures on a stitcher.

The cover is printed with an address indicated at 18. As used herein, the word "address" can include a name and/or a street address which identifies the individual or destination to which the response device will be sent. A tracking code number 19 is printed on the address page of the book and on selected coupons on one or more inside pages. FIG. 3 illustrates one conventional method for printing a code number on the cover and on inside pages by a stitcher. A stitcher machine is a well known device in the printing industry and is described, for example, in U.S. Pat. Nos. 4,121,818 and 4,395,031.

The stitcher includes means for separating one or more inside pages of the book so that inside pages can be printed by inkjet printers. An inkjet printer 20 prints the address on the cover 16, and inkjet printers 21, 22, and 23 print the code number on the cover and on the coupons on the inside pages 17a and 17b. Each of the inside pages is formed from a folded signature, and a plurality of folded signatures which will form a book are stacked and carried on the conveyor of the stitcher.

Additional inkjet printers can be used to print the tracking code on other inside pages. However, increasing the number of inkjet printers increases the cost and decreases the efficiency of the printing operation. Not only must the additional cost of the inkjet equipment be incurred, but additional labor is required to set up the equipment and make sure that the equipment is working properly. Inkjet printers are subject to clogging, and each time a printer clogs or otherwise becomes inoperable, the printing process must be shut down.

A computer and software which is associated with the stitcher controls the printing of the address and the tracking code. An address list is fed to the computer, and the cover page of each book and perhaps inside pages will be printed with an address and a tracking code. A different address and a different tracking code will be used for each book. The software correlates the address and the tracking code of each book, and the addresses and tracking codes are stored on computer disk or tape to provide a data record.

After the cover and selected inside pages are printed with the inkjet equipment, the stitcher binds the pages together, for example, by stapling, to form an integrated book.

When a coupon is redeemed and returned, the tracking code is read and the associated address is retrieved from data storage. However, since only a few of the coupons of each book can be economically and efficiently printed with a tracking code on a stitcher or bindery line, only a few coupons from each book can be tracked.

The code number 19 illustrated in FIG. 1 is a numeric code, and the numeric code must be manually inputted into a computer or other data retrieval device in order to retrieve the correlated address. FIG. 2 illustrates a mailing book 24 which is similar to the mailing book 15 of FIG. 1 except that the book 24 is printed with a bar code 25. The bar code can be scanned with an automated bar code reading device so that the associated address can be retrieved automatically.

Figure 4:
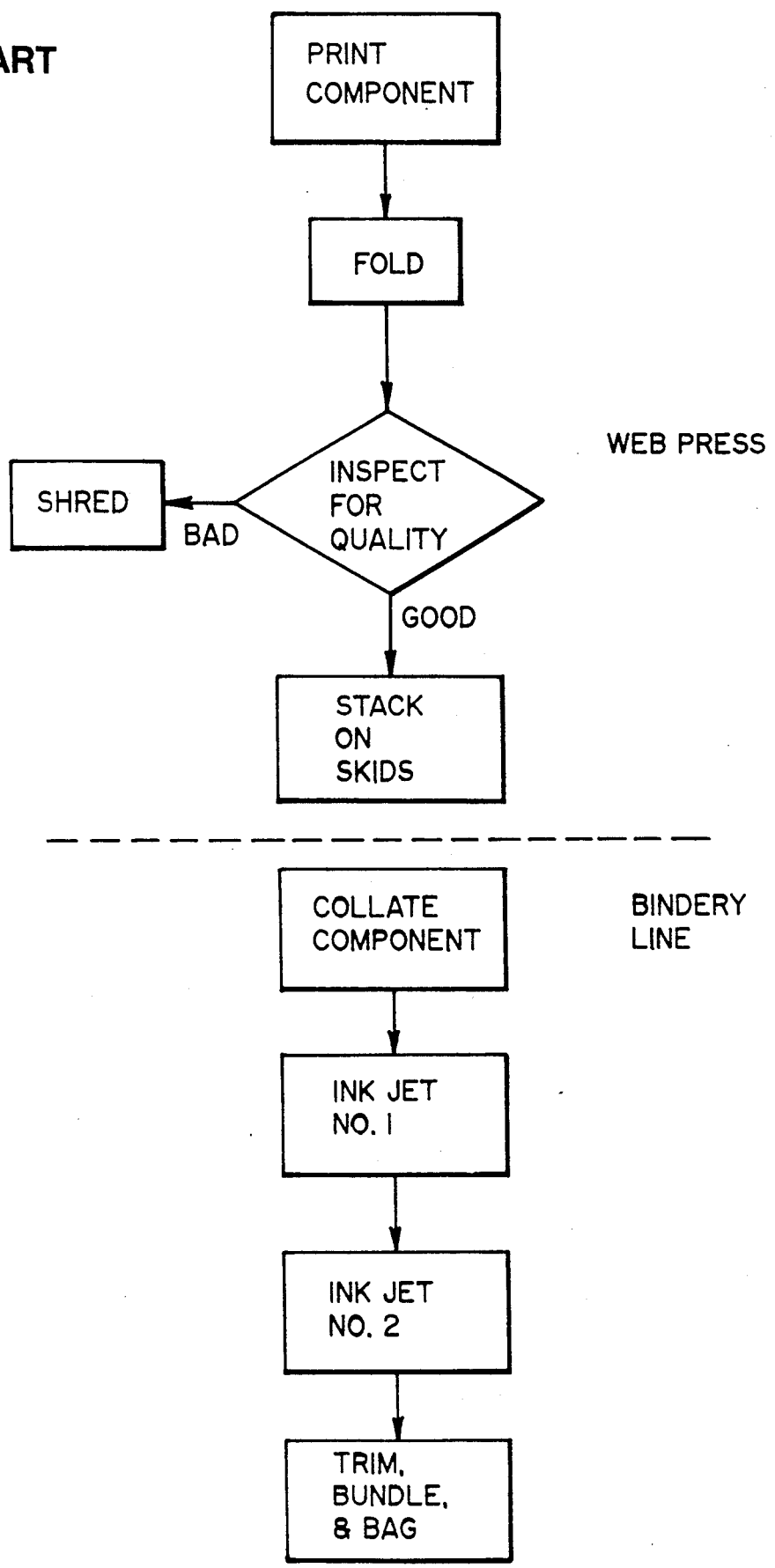
FIG. 4 is a flow chart illustrating the method of addressing and encoding the books of FIGS. 1 and 2.

FIG. 4 is a flow chart illustrating the prior art method of preparing the coupon books of FIGS. 1 and 2. The portion of the operation which is above the dotted line is performed on a conventional web press or printing press, and the portion of the operation which is below the dotted line is performed on a stitcher or bindery line. As illustrated in FIG. 4, a web of paper is printed with the coupons, advertising information, and other printed information which will be contained in the book. The printed web is folded to form a plurality of signatures or folded sheets, and the signatures are inspected for quality. Signatures which do not comply with predetermined quality specifications, for example, because of poor printing, ink blotches, misalignment, etc., are rejected and shredded. Signatures which pass the quality specifications are stacked on skids for later processing by the stitcher or bindery line.

The stacked signatures are fed through the bindery line, which collates the components and prints an address and code number on one or more pages of each book as indicated by the stations identified as "Inkjet No. 1" and "Inkjet No. 2". Thereafter, the books are trimmed, bound, bundled into groups of books, and bagged for delivery to the mailing operation.

Figure 5:
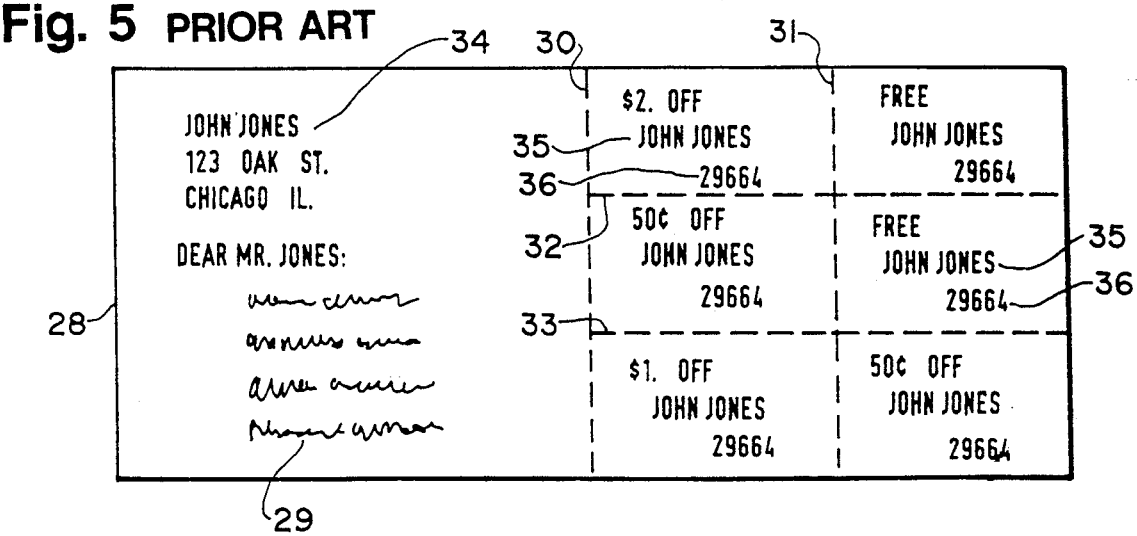
FIG. 5 is a plan view of a prior art response device which includes multiple addressed and encoded coupons.

FIG. 5 illlustrates another prior art response device 28 which can be prepared on a wide bar imager or laser printer. The response device is formed from a pre-printed roll of web material which includes printed advertising information indicated at 29 and a plurality of coupons which are printed between vertical lines 30 and 31 and horizontal lines 32 and 33. The lines 30-33 can be perforated or can simply indicate a line for tearing or cutting. The preprinted web is run through a conventional imager or laser printer, and customized information including an address and code numbers are applied. The components are either sheeted, rewound, or folded. They are then inserted or finished and mailed.

In FIG. 5 an address 34, which includes both a name and a street address, is applied to the left hand portion of the response device. Each of the coupons is printed with an address 35 and a code number 36. The code number for each of the coupons is the same, and the code number is correlated with the address and stored for later retrieval when a coupon is redeemed.

Figure 6:
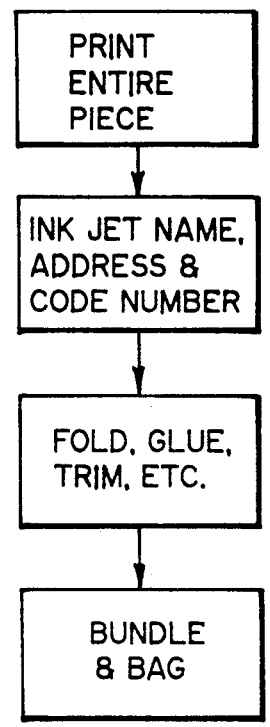
FIG. 6 is a flow chart illustrating the method of printing and encoding the response device of FIG. 5.

FIG. 6 is a flow chart which illustrates the process of printing the response device of FIG. 5.

Figure 7:
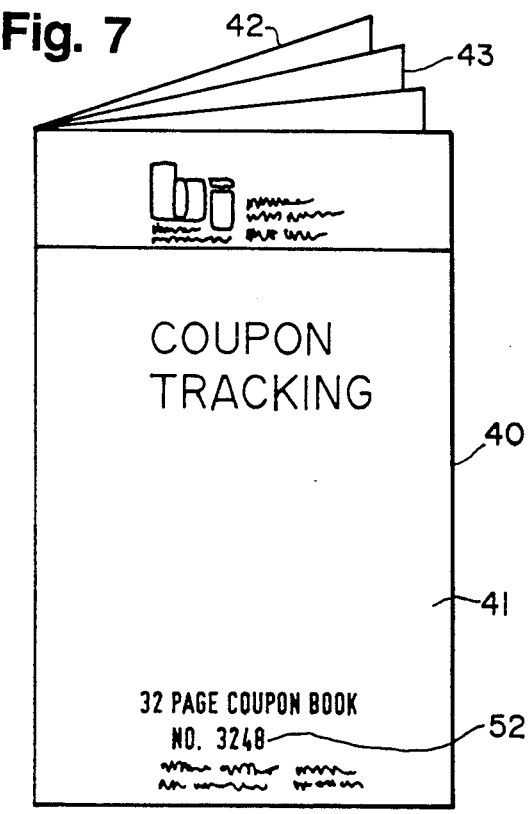
FIG. 7 is a perspective view of the front cover of a coupon mailing book which is formed in accordance with the invention.
Figure 8:
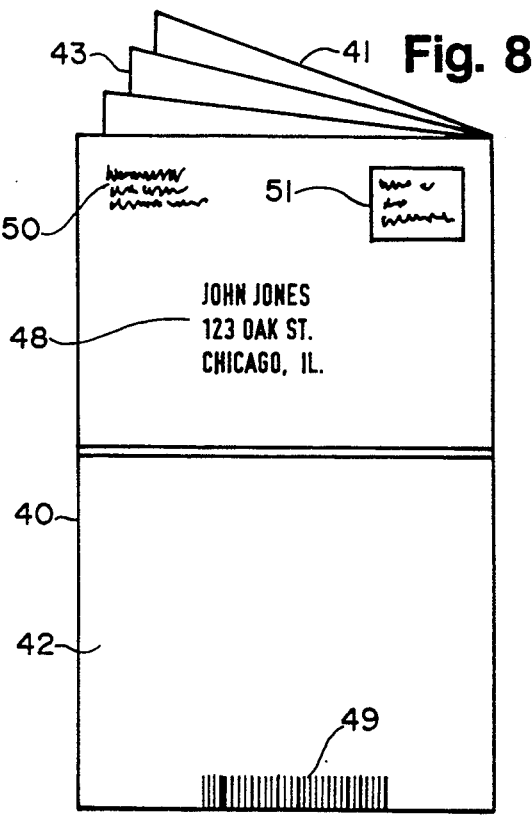
FIG. 8 is a perspective view of the rear cover of the coupon mailing book of FIG. 7.
Figure 9:
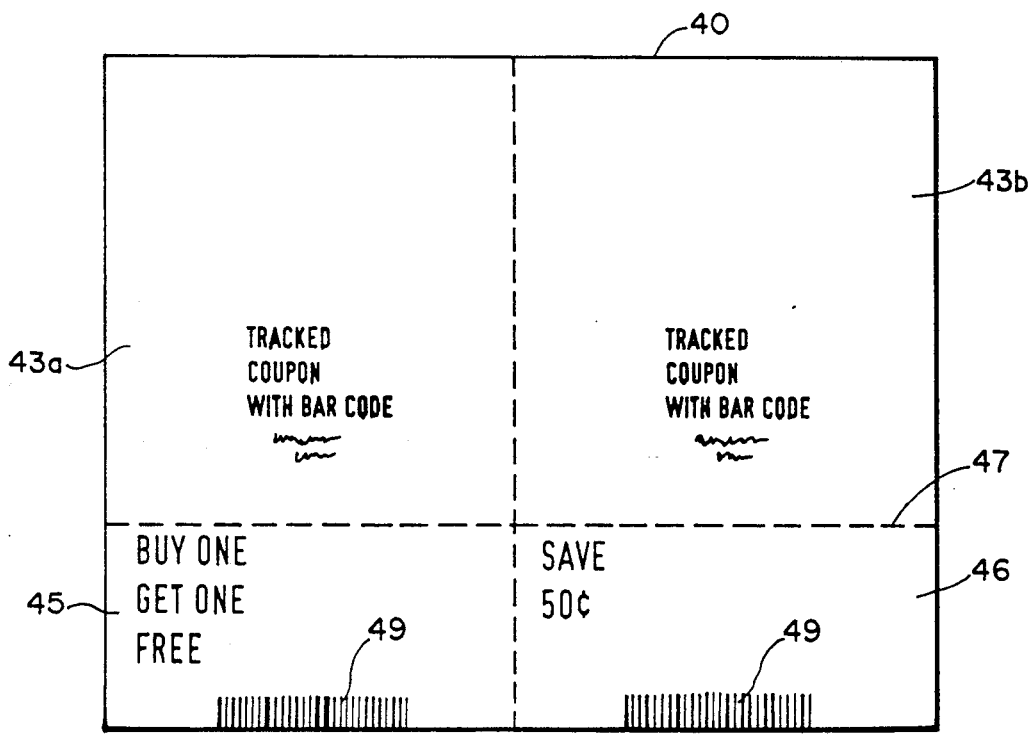
FIG. 9 is a plan view of a pair of inside pages of the coupon mailing book of FIG. 7.

FIGS. 7-9 illustrate a coupon book 40 which is formed in accordance with the invention. The coupon book includes a folded cover sheet which provides a front cover 41 and a back cover 42 and a plurality of folded inside sheets which provide inside pages 43. FIG. 9 illustrates the book opened to display two of the pages 43a and 43b. Each of the inside pages may include a response device, for example, "cents-off" coupons 45 and 46 which are printed at the bottom of pages 43a and 43b and defined by a perforation or cut line 47.

An address 48 (FIG. 8) is printed on the back cover of the book, and a tracking bar code 49 may also be printed on the back cover and/or front cover. The back cover can also be printed with a return address 50 and a mailing stamp 51. If desired, a numeric code number 52 (FIG. 7) which corresponds to the bar code can be printed on the front or back cover of the book or on desired inside pages.

As can be seen in FIG. 9, the response devices 45 and 46 are printed with the same tracking bar code 49 which appears on the back cover. Other pages of the coupon book can also include response devices, and as many of the response devices as desired are printed with the tracking bar code 49. The tracking code can include information which identifies a specific response device, for example, a response device for a particular product, as well as information which identifies a particular book.

Figure 10:
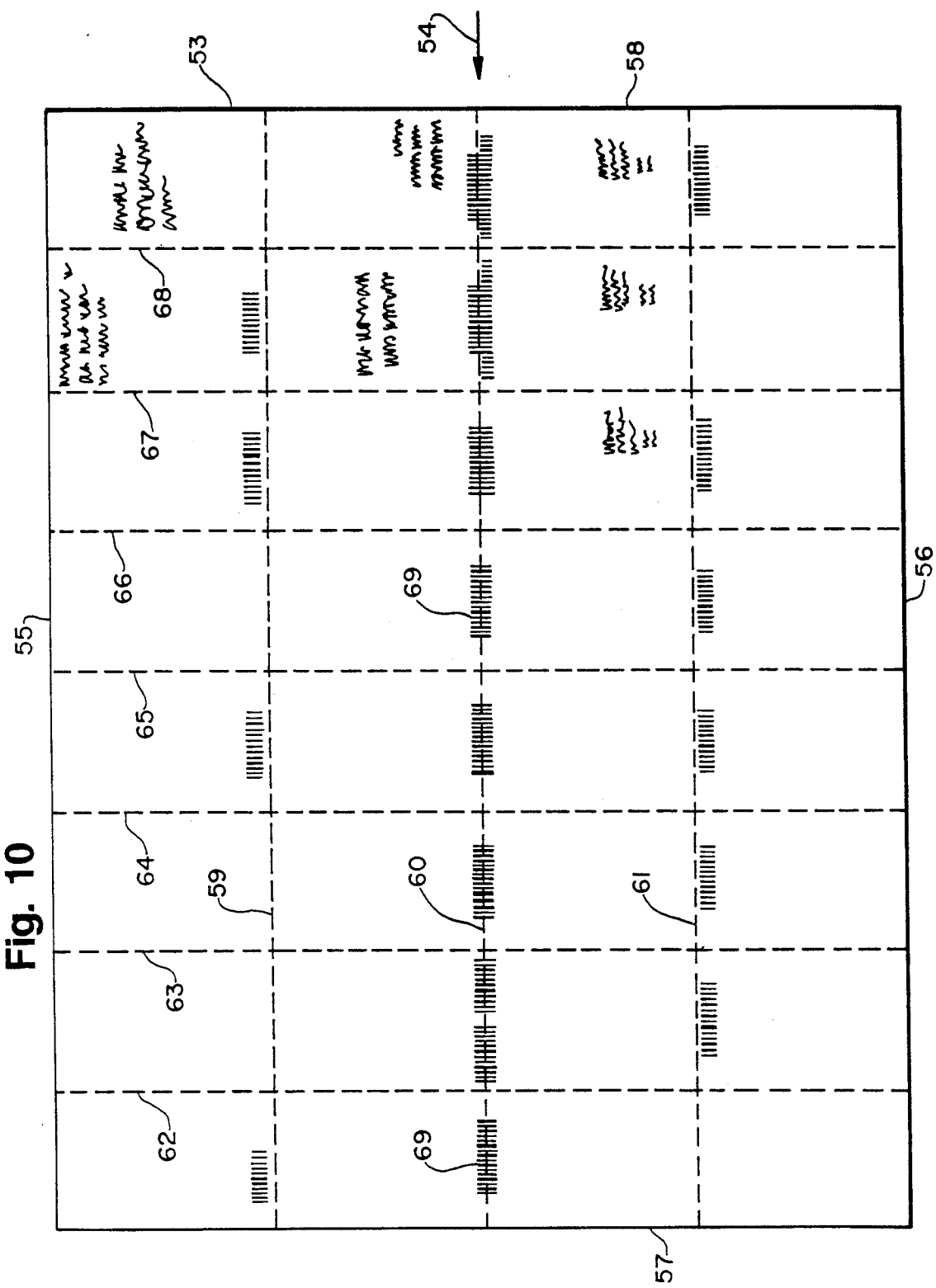
FIG. 10 is a plan view of a portion of a paper web which is inprinted to form the coupon mailing book of FIG. 7.

One of the unique aspects of preparing the coupon book of FIGS. 7-9 comprises printing the tracking code separately from the address. FIG. 10 illustrates a portion of a paper web 53 which has been printed by a conventional printer or web press. The particular web illustrated is printed on both sides and will ultimately be folded and trimmed to form two 32 page books. The web can also be printed for other formats, for example, books with more or less pages or single sheets with multiple coupons. The machine direction is indicated by arrow 54, and the web includes side edges 55 and 56. The edges 57 and 58 are provided by transverse cuts of the web. The pages which are printed on the web are defined by longitudinal fold lines 59 through 61 and transverse fold lines 62 through 68. Each page can be printed with the desired printed material, for example, advertising and a coupon or other response device. Any response device for which tracking is desired is also printed by separate ink jet heads with a tracking code 69, for example, a bar code.

The web 55 illustrated in FIG. 10 will ultimately be folded and trimmed to form two separate, duplicate 32 page books or other configurations of signatures. The same press can produce a wide variety of products with coupon tracking codes. Since each book will have a distinct tracking code, the portions of the web which will form the pages of one book are printed with one tracking code, and the portions of the web which will be folded to form the pages of the second book are printed with a second tracking code. The folding and trimming operations of a web such as is illustrated in FIG. 10 is well known and conventional in the printing industry, and the printing press is adjusted to print the appropriate printed material and tracking code on each page portion of the web. Both sides of the web are printed to form the two 32 page books, and tracking codes can be printed on both sides of the web.

Since the tracking codes are printed by the printing press, as many of the page portions of the web as desired can be printed with the appropriate tracking code as the web passes through the printing press. Each page portion of the web which will form a single book comprises a set of pages, and the pages of each set or book for which tracking is desired are printed with the same tracking code. As stated previously, the code may also include other information, for example, the identity of the product. Each book will have a different tracking code. Since the web in FIG. 10 will be folded to form two books, two different tracking codes will be printed on the web.

FIG. 10 illustrates only one repeat segment of the continuous paper web which is printed by the press. It will be understood that the continuous web will be repetitively printed in order to print the total number of books which is desired. However, the computer which controls the printing of the tracking codes will automatically assign two new and distinct codes to each web segment, one code for each of the two books which will be formed by the segment.

After the web is printed with the tracking codes and the other printed material which will appear in the books, the web is cut into segments as illustrated in FIG. 10. Each web segment is then folded into a press signature 70 illustrated in FIG. 11. In a later operation the pres signature 70 will be cut along the line indicated in phantom at 71 to form two separate, duplicate books. Since the portions of the press signature on opposite sides of the cut line 71 will form separate books, they are printed with different tracking codes 72 and 73. The press signatures are inspected to ensure that the press signatures meet predetermined quality control specifications. Press signatures which do not meet the specifications are rejected, and press signatures which meet the specifications are stacked for later processing.

Except for the process of imprinting selected pages of each of the books with a distinct tracking code, the foregoing press operations are conventional and well known.

The press signatures which pass the inspection procedure are ultimately brought to a mailing line, which can be a saddle stitcher, collator, wrapper, folder, perfect binder, or simply a mailing table. The mailing line includes conventional computer-controlled equipment for reading and addressing a mailing list. As the press signatures pass through the mailing line, the tracking code for each book is identified, for example, by scanning the bar code if the tracking code is a bar code, and an address is printed on each book, for example, by an inkjet printer. As the books are addressed, the software of the computer creates a data record which correlates the address and tracking code for each book, and the data record is stored on computer tape or disk.

When a coupon or other response device from a particular book is redeemed, the tracking code is read, for example, by a bar code scanner, and the address which is associated with that tracking code is retrieved from data storage. The address to which the response device was sent can therefore be identified.

Figure 12:
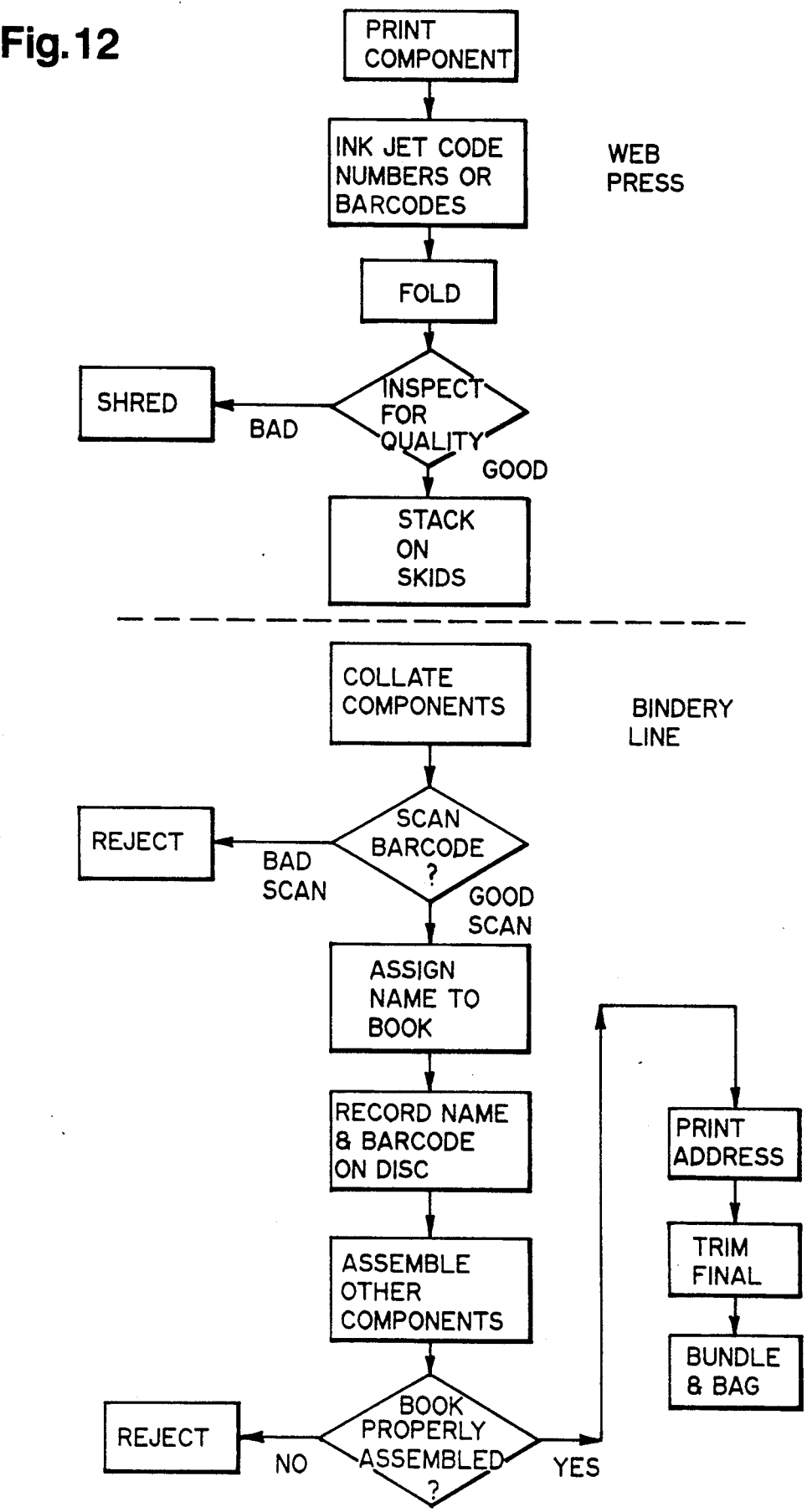
FIG. 12 is a flow chart illustrating the process of encoding and addressing the coupon mailing book of FIG. 7.

FIG. 12 is a flow chart which illustrates the inventive two-step method of applying the tracking code and the address. The portion of the process which is above the horizontal line is performed on a conventional printer or web press. The portion of the process which is below the dotted line can be performed on a conventional bindery line or stitcher, for example, the stitchers described in U.S. Pat. Nos. 4,121,818 and 4,395,031.

Figure 11:
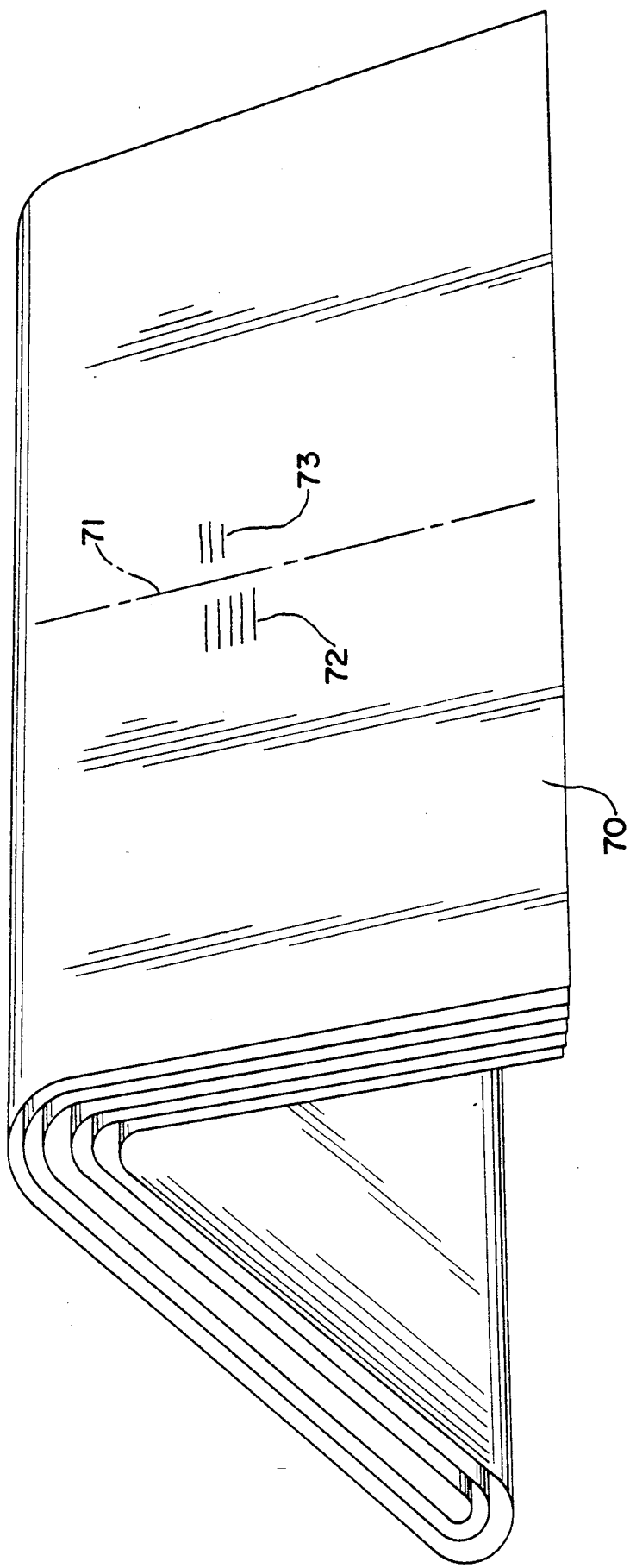
FIG. 11 is a perspective view of a press signature which will be cut to form two coupon books.

As the web passes through the printing press, the portions of the web which will form individual pages are printed, a distinct tracking code for each book or signature or component is printed on the pages for which tracking is desired, for example, by inkjet printers, and the web is cut and folded to form the press signature 70 which is illustrated in FIG. 11. The folded press signatures are inspected for quality, for example, proper color, absence of ink blotches, and alignment. Press signatures which do not meet the quality specifications are rejected and shredded. Press signatures which meet the quality specifications are stacked on skids for later processing.

On the bindery line the folded press signatures are collated, and the tracking code or bar code of each book or signature is scanned by conventional scanning equipment. Books which do not meet quality specifications for the scan are rejected. Books which meet the quality specifications for the scan continue along the bindery line.

A conventional computerized addressing machine assigns an address to each book, and the address and tracking code of each book is correlated and stored on tape or disk. The bindery line then performs conventional processing steps such as trimming and binding, and the bindery line determines automatically whether the book has been properly assembled. Books which do not pass the assembly specification are rejected. Books which pass the assembly specification are then printed with the previously assigned addresses. The printed books then proceed through final trimming and are bundled and bagged for later mailing.

At any point in the process up to determining whether the books have been properly assembled, any book which does not pass the quality control specifications can be rejected without losing any of the addresses on the mailing list. The addresses are not assigned to the books until the books pass several quality checks. Any book which is rejected before an address is assigned to the book can be simply discarded, and the addressing equipment never becomes aware of that book.

The addressing equipment controls the rejection of a book, and an address is not assigned to a book until the book reaches the final step on the line. If a book is rejected after an address is assigned to the book, the addressing equipment reassigns that address to a subsequent book and deletes the tracking code of the first book before the data is recorded. Each data record with the address and tracking code is time and date stamped when it is recorded.

Since the address is not printed on the printing press, there is no problem with lost addresses if the web breaks or the printing press is shut down.

Heretofore, the tracking codes and the addresses were printed by the same equipment. Accordingly, if any book failed to meet quality control specifications after the tracking code was printed, the address of the rejected book had to be retrieved and reprinted so that no address from the mailing list was lost. The unique two-step process of this invention for printing the tracking code and then the address allows for better quality control without losing addresses and faster processing in the event of press breakdown or the like.

Although I have described the invention as being used with coupon books, the invention can be used with any type of response device, for example, single page devices of the type illustrated in FIG. 5, card decks, etc. Also, many varieties of formats can be used. For example, the equipment can gather (collate) signatures (sets) on top of one antoher, scan cards signature, and form a book with a plurality of sets. Each set has its own tracking number, and each set is related to an address and stored.

While in the foregoing specification a detailed description of specific embodiments was set forth for the purpose of illustration, it will be understood that many of the details herein given may be varied considerably by those skilled in the art without departing from the spirit and scope of the invention.

I claim:

1. A method of preparing trackable response devices comprising the steps of:
    passing a web of paper through a printing line,
    printing the web with a plurality of response devices,
    printing tracking codes on at least some of the response devices, some of the response devices having the same tracking code and comprising a set of response devices, each set having a different tracking code,
    folding and trimming the web to form a plurality of separate groups of response devices so that the response devices of each set are included in a separate group having multiple pages of response devices,
    removing the separate groups from the printing line,
    inspecting each of the groups for compliance with predetermined quality standards for printing and accepting the groups which comply with the standards and rejecting the groups which do not comply with the standards,
    passing the groups of accepted response devices through a mailing line and printing each of the separate groups with a different address, and
    storing the address of each of the separate groups and the tracking code which is associated with the response devices of the group.

2. A method of preparing trackable response devices comprising the steps of:
    passing a web of paper through a printing line,
    printing the web with a plurality of response devices,
    printing tracking codes on at least some of the response devices, some of the response devices having the same tracking code and comprising a set of response devices, each set having a different tracking code,
    trimming the web to form a plurality of separate groups of response devices so that the response devices of each set are included in a separate group,
    removing the separate groups from the printing line,
    inspecting each of the groups for compliance with predetermined quality standards for printing and accepting the groups which comply with the standards and rejecting the groups which do not comply with the standards,
    passing the groups of accepted response devices through a mailing line and printing each of the separate groups with a different address, and
    storing the address of each of the separate groups and the tracking code which is associated with the response devices of the group.

3. A method of preparing trackable response devices comprising the steps of:
    passing a web through a printing line,
    printing multiple portions of the web on a plurality of locations to provide page portions on each of the multiple portions of the web,
    printing a machine readable tracking code on a plurality of the page portions of each of the multiple web portions, the machine readable tracking code for each web portion being different,
    folding and trimming the web to form a book from each of the multiple web portions, each book having a cover and a plurality of pages formed from said page portions,
    removing the books from the printing line,
    inspecting each of the books for compliance with predetermine quality standards for printing and accepting the books which comply with the standards and rejecting the books which do not comply with the standards, passing each of the accepted books through a mailing line, printing a different address on the cover of each of the books, and storing the address of each book and the tracking code which is associated with each book.

* * * * *